(12) United States Patent
Okabe et al.

(10) Patent No.: US 6,863,814 B2
(45) Date of Patent: Mar. 8, 2005

(54) IN-TANK TYPE FUEL FEED APPARATUS

(75) Inventors: Kenji Okabe, Obu (JP); Hideki Narisako, Kariya (JP); Yoshio Ebihara, Kariya (JP); Kouji Izutani, Nagoya (JP)

(73) Assignee: Denko Corporation, Kariya (JP)

( * ) Notice: Subject to any disclaimer, the term of this patent is extended or adjusted under 35 U.S.C. 154(b) by 0 days.

(21) Appl. No.: 10/462,660

(22) Filed: Jun. 17, 2003

(65) Prior Publication Data

US 2004/0000516 A1 Jan. 1, 2004

(30) Foreign Application Priority Data

Jun. 28, 2002 (JP) ....................................... 2002-189293

(51) Int. Cl.$^7$ ........................ B01D 35/027; F02M 37/02
(52) U.S. Cl. ..................... 210/416.4; 210/232; 210/460
(58) Field of Search .............................. 210/232, 416.1, 210/416.4, 459, 460

(56) References Cited

U.S. PATENT DOCUMENTS

| | | | |
|---|---|---|---|
| 4,861,474 A | * | 8/1989 | Kroha ........................ 210/232 |
| 5,084,166 A | * | 1/1992 | Shiraga et al. .............. 210/172 |
| 6,293,770 B1 | * | 9/2001 | Matsumoto et al. ........ 417/361 |
| 2004/0129626 A1 | * | 7/2004 | Fischer et al. ........... 210/416.4 |
| 2004/0140257 A1 | * | 7/2004 | Dockery et al. ......... 210/416.4 |

FOREIGN PATENT DOCUMENTS

| | | |
|---|---|---|
| EP | 1 043 495 | 10/2000 |
| JP | 8-121282 | 5/1996 |
| JP | 10-252592 | 9/1998 |

* cited by examiner

Primary Examiner—Fred G. Prince
(74) Attorney, Agent, or Firm—Nixon & Vanderhye P.C.

(57) ABSTRACT

A fuel feed apparatus is accommodated in a fuel tank. Hooking projection parts have claws formed on a fuel discharge side of a fuel pump. The claws are fitted and hooked in an opening formed on a filter case, so that the fuel pump is protected from dropping out from the filter case. The entire circumference of the fuel discharge side of the fuel pump is inserted with force into a press-insertion part formed in the filter case. A fuel suction side of the fuel pump is not supported by other parts, so it is in free condition.

7 Claims, 3 Drawing Sheets

FIG. 4 <u>RELATED ART</u>
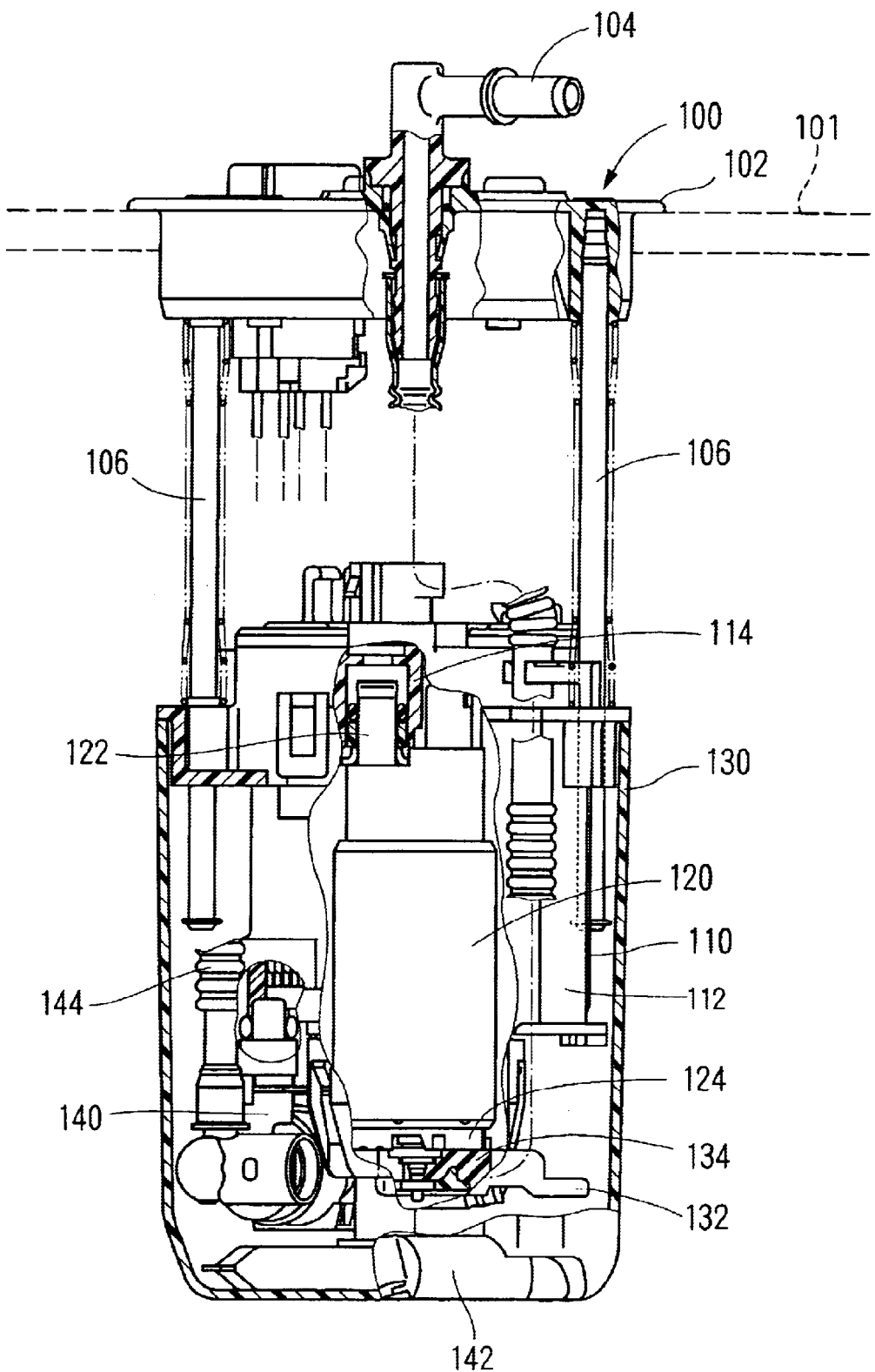

IN-TANK TYPE FUEL FEED APPARATUS

CROSS REFERENCE TO RELATED APPLICATION

This application is based on and incorporates herein by reference Japanese Patent Application No. 2002-189293 filed on Jun. 28, 2003.

FIELD OF THE INVENTION

This invention relates to an in-tank type fuel feed apparatus.

BACKGROUND OF THE INVENTION

As shown in FIG. 4, an in-tank type fuel feed apparatus is generally arranged inside a fuel tank 101 to feed fuel in the fuel tank 101 to outside of the fuel tank 101.

A mounting member 102 of a fuel feed apparatus 0 is installed in the fuel tank 101. A filter case 112 of a fuel filter 110 is connected with the mounting member 102 by metal pipes 106. The filter case 112 is formed as a C-shaped member in cross-section, covers around a fuel pump 120. The fuel filter 110 and the fuel pump 120 are accommodated in a sub-tank 130. The fuel pump 120 discharges fuel from a fuel discharge port 122, the fuel is sucked from a fuel suction port 124 side, by rotation of a rotor member such as an impeller. The fuel discharge port 122 is fitted at a fuel inlet port 114 of the filter case 112. The fuel removed of debris by the filter element accommodated in the filter case 112, is pressure-regulated by a pressure regulator 140 and supplied from a fuel outlet pipe 104 to an injector or the like outside of the fuel tank 101. The fuel suction port 124 of the fuel pump 120 is supported by a holder 132 coupled with the filter case 112. A rubber cushion 134 is attached by sandwiching between the fuel suction port 124 and the holder 132.

The pressure regulator 140 is connected with a jet pump 142 by a bellows tube 144. The jet pump 142 jets surplus fuel discharged from the pressure regulator 140, transports fuel in the fuel tank 101 to the inside of the sub-tank 130.

The fuel discharge port 122 of the fuel discharge side of the fuel pump 120 is fitted at the fuel inlet port 114 of the filter case 112, and the fuel suction port 124 is supported by the holder 132 combined with the filter case 112. Thus, vibration of the fuel pump 120 generated by suction and discharge of fuel is transmitted to the filter case 112. The transmitted vibration to the filter case 112 is transmitted from the mounting member 102 and the sub-tank 130 to the fuel tank 101, then, is transmitted to the outside of the fuel tank 101 as noise.

SUMMARY OF THE INVENTION

It is therefore an object of the present invention to provide a low noise fuel feed apparatus.

Another object of the present invention is to provide a fuel feed apparatus in which a pressure regulator and a jet pump are connected easily.

According to the present invention, a fuel feed apparatus is arranged in a fuel tank, and has a mounting member attached to the fuel tank, a fuel pump, and a fuel filter including a filter element and a filter case. In one aspect, one of a fuel discharge side of the fuel pump and the filter case has a hooking projection part, and the other has a hooking projection receiving part to be hooked to the hooking projection part. The fuel discharge side of the fuel pump is supported by the filter case by connection of the hooking projection part and the hooking projection receiving part each other, and a fuel suction side is in free condition. In another aspect, the filter case has a press-insertion part which is ringed and supporting the fuel pump, into which a fuel discharge side of the fuel pump is inserted with force. The fuel suction side of the fuel pump is in free condition.

BRIEF DESCRIPTION OF THE DRAWINGS

The above and other objects, features and advantages of the present invention will become more apparent from the following detailed description made with reference to the accompanying drawings. In the drawings:

FIG. 4 is a cross-sectional view illustrating a fuel feed apparatus according to a related art.

DETAILED DESCRIPTION OF THE PREFERRED EMBODIMENT

Figure 1:
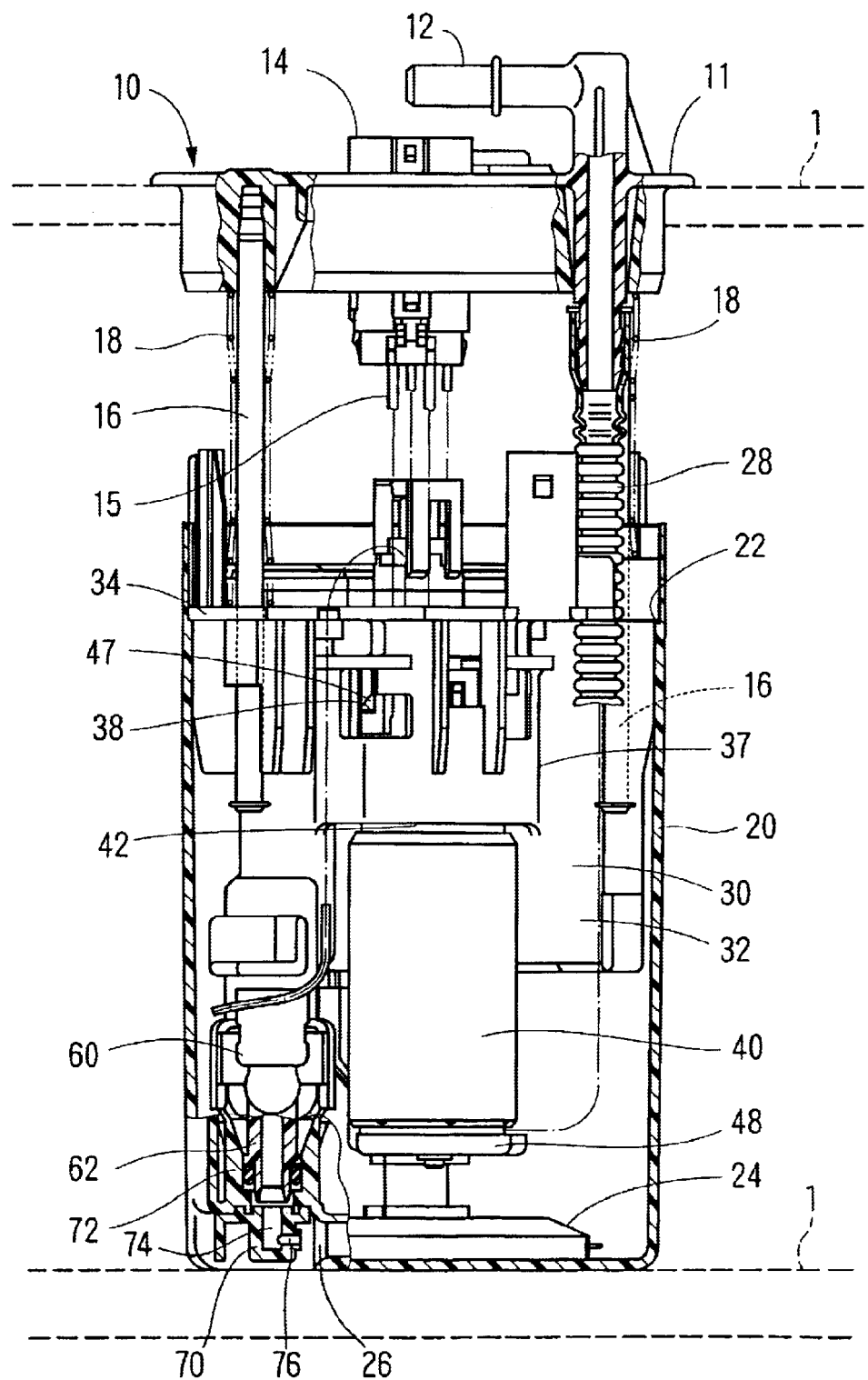
FIG. 1 is a cross-sectional view of a fuel feed apparatus according to an embodiment of the invention.

A preferred embodiment of the present invention will be described with referent to figures below. A fuel feed apparatus according to an embodiment of the present invention is shown in FIG. 1. A mounting member 11 of a fuel feed apparatus is formed as a disc and received on the upper wall of a fuel tank 1 molded integrally. The parts of the fuel feed apparatus except for the mounting member 11 are accommodated in the fuel tank 1.

A fuel discharge pipe 12 and an electric connector 14 are built on the mounting member 11. The fuel discharge pipe 12 is for supplying fuel discharged from a fuel pump 40 accommodated in a sub-tank 20 to outside of the fuel tank 1. The electric connector 14 supplies electric power to the fuel pump 40 with a lead wire 15.

A metal pipe 16 is inserted with force into the mounting member 11 at one side, and the other side is inserted loosely into a flange 34 installed on the upper side of a filter case 32. A spring 18 applies a force to the mounting member 11 and the flange 34 of the filter case 32 to part from each other. The flange 34 is received on a step 22 formed on the inside wall of the opening of the sub-tank 20, so that movement of the flange 34 to the lower side of the FIG. 1 is restricted. Therefore, though the fuel tank 1 made of resin expands or shrinks by change of inner pressure due to thermal change or change of the amount of fuel, the bottom part of the sub-tank 20 is always pressed to the inner bottom part of the fuel tank by force of the spring 18.

A suction filter 24, a fuel filter 30, the fuel pump 40, and a pressure regulator 60, etc. are accommodated in the sub-tank 20. The suction filter 24 arrests relatively large debris contained in the fuel sucked by the fuel pump 40 from the sub-tank 20. The pressure regulator 60 controls pressure of fuel discharged by the fuel pump 40 at the set point. The fuel filter 30 arrests relatively small debris contained in the fuel discharged by the fuel pump 40 with a filter element, not shown, housed in the filter case 32.

Figure 2:
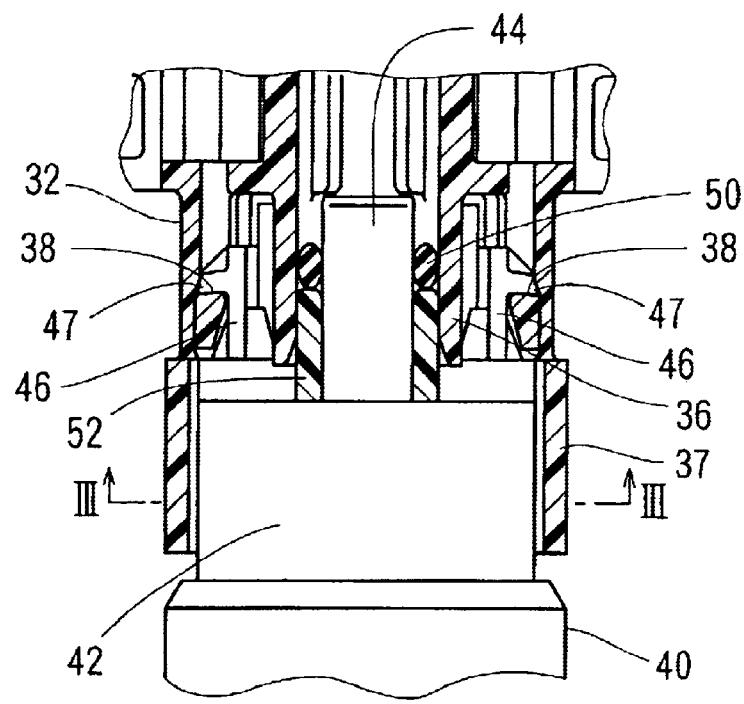
FIG. 2 is an enlarged cross-sectional view illustrating a fuel discharge side of the fuel pump.

The fuel pump 40 is accommodated in the sub-tank 20 as shown in FIG. 1. A fuel discharge side 42 of the fuel pump 40 is at vertically upper side, and a fuel suction side 48 is at vertically lower side. The fuel pump 40 houses a motor inside as an electrically driving part, not shown, and generates fuel suction force by rotation of the impeller which rotates with the motor as a rotation part. As shown in FIG. 2, a fuel discharge port 44 of the fuel pump 40 is fitted and combined with a fuel inlet port 36 of the filter case 32. The outer round wall of the fuel discharge port 44 and the inner round wall of the fuel inlet port 36 is sealed with an O-ring 50. A hooking member 52 is formed in a cylindrical shape, and fitted outside of the fuel discharge port 44. The hooking member 52 protects from dropping out of the O-ring 50 from the fuel inlet port 36 to the lower side in FIG. 2.

The fuel discharge side 42 of the fuel pump 40 including the fuel discharge port 44 is covered with resin. Hooking projection parts 46 are formed on the fuel discharge side 42 of the fuel pump 40 in two semi-circular segments with a space separating the segments. The hooking projection parts 46 project from the fuel discharge side 42 in the fuel discharge direction. Claws 47 are formed on the hooking projection parts 46 as hooking projections that project radially away from the outside surface of the hooking projection parts 46. Openings 38 are formed at corresponding positions to the hooking projection parts 46 of the filter case 32 as square-shaped receiving parts. The claws 47 are fitted and hooked in the openings 38. The claws 47 are hooked, that is, snap-fitted, in the openings 38. Thus the fuel pump 40 is protected from dropping out from the filter case 32 to the lower side in FIG. 1. The entire circumference of the fuel discharge side 42 of the fuel pump 40 is inserted with force into a press-insertion part 37 formed in a cylindrical shape of the filter case 32.

Figure 3:
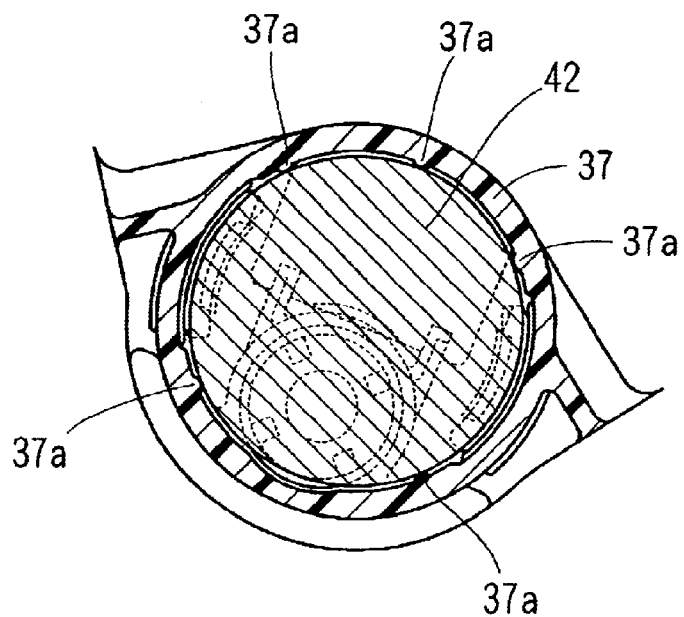
FIG. 3 is a cross-sectional view taken along the line III—III in FIG. 2.

As shown in FIG. 3, a plurality of projections 37a are formed around inside surface of the press-insertion part 37 and contact outside round wall of the fuel discharge side 42. The fuel discharge side 42 is inserted with force into the press-insertion part 37, and the fuel discharge side 44 of the fuel pump 40 is fitted into the fuel inlet port 36 of the filter case 32. By this assembling work, the claws 47 are fitted into the opening 38. The fuel discharge side 42 and the fuel suction side 48 positioned oppositely are not supported by other parts against the rotation axis of the fuel pump 40, and they are in free condition. Free condition means parts are not supported by other parts, and movement of the parts is not restricted.

The pressure regulator 60 controls pressure of the fuel discharged from the fuel pump 40. The fuel passes through the fuel filter 30 and a bellows pipe 28 toward the fuel discharge pipe 12. A fuel inlet port, not shown, of the pressure regulator 60 is fitted and combined directly with a fuel outlet port, not shown, of the filter case 32. A fuel inlet port 72 of a jet pump 70 is formed inside of a bottom part of the sub-tank 20. A fuel outlet port 62 of the pressure regulator 60 is fitted and combined directly with the fuel inlet port 72 of the jet pump 70.

The jet pump 70 is installed outside of the sub-tank 20 by ultrasonic welding or the like. A fuel path 74 of the jet pump 70 links to the path inside of the fuel inlet port 72. The surplus fuel, which is discharged from the fuel outlet port 62 of the pressure regulator 60, when the pressure regulator 60 controls pressure of the fuel from the fuel filter 30, passes through the bellows pipe 28 toward the fuel discharge pipe 12. The surplus fuel passes through the way inside of the fuel inlet 72 and the fuel path 74, then is injected from the nozzle 76 of the jet pump 70 to a fuel inlet port 26 formed on the sub-tank 20. Negative pressure is generated around a nozzle 76 and the fuel inlet port 26 by the injection of the fuel from the nozzle 76. The fuel in the fuel tank 1 is supplied to the inside of the sub-tank 20 by this negative pressure. Though the amount of the fuel in the fuel tank 1 is decreased, inside of the sub-tank 20 is filled with fuel.

As explained above, a fuel discharge side 42 positioned at the vertically upper side of the fuel pump 40 is fitted and hooked on the filter case 32, the fuel suction side 48 positioned at the vertically lower side of the fuel pump 40 is not supported by any other parts and in free condition. Though the fuel pump 40 vibrates due to discharge and suction by rotation of the rotation member such as impeller of the fuel pump 40, the fuel discharge side 42 of the fuel pump 40 is supported and hanged by hooking on the filter case 32. Therefore, the vibration of the fuel pump 40 is less likely to be transmitted to the filter case 32 easily. Vibration of the fuel pump 40 is less likely to be transmitted easily from the fuel filter 30 to the mounting member 11 and from sub-tank 20 to outside of the fuel tank 1 via the fuel tank 1. Therefore, it decreases noise occurring from the fuel feed apparatus.

Furthermore, the fuel discharge side 42 of the fuel pump 40 is inserted with force into the press-insertion part 37 of the filter case 32, it can avoid vibration of the fuel discharge side 42.

The fuel inlet port of the pressure regulator 60 is combined directly with the fuel outlet port of the filter case 32, the fuel outlet port 62 of the pressure regulator 60 is combined directly with the fuel inlet port 72 of the jet pump 70 formed inside of the bottom of the sub-tank 20. The filter case 32 and the sub-tank 20 are combined by the pressure regulator 60. Thus, the fuel filter 30 and the fuel pump 40 are supported by the sub-tank 20 stably.

Furthermore, the pressure regulator 60 and the jet pump 70 are combined directly, so the pressure regulator 60 and the jet pump 70 need not be connected with pipe or the like. Therefore, the pressure regulator 60 and the jet pump 70 can be connected easily and path of the connection is shortened.

In this embodiment, the claws 47 as hooking projections are formed on the fuel discharge side 42 of the fuel pump 40, and the openings 38 as hooking projection receiving parts are formed at the filter case 32 side. Hooking projection receiving parts can be formed at the fuel discharge side 42 of the fuel pump 40 and hooking projections can be formed at the filter case 32 side.

The present invention should not be limited to the enclosed embodiment, but may be implemented in many ways without departing from the spirit of the invention.

What is claimed is:

1. A fuel feed apparatus arranged in a fuel tank to feed fuel in the fuel tank to outside of the fuel tank comprising:

a mounting member attached to the fuel tank;

a fuel pump which is electrically-driven to discharge suction fuel; and a fuel filter including a filter element to remove debris contained in the discharged fuel by the fuel pump and a filter case accommodating the filter element and connected with the mounting member, wherein one of a fuel discharge side of the fuel pump and the filter case has a hooking projection part, the other of the fuel pump and the filter case has a hooking projection receiving part to be hooked to the hooking projection part, the fuel discharge side of the fuel pump is supported by the filter case by connection of the hooking projection part and the hooking projection receiving part each other, and a fuel suction side is in free condition.

2. The fuel feed apparatus according to claim 1, wherein the filter case has a ring-shaped press-insertion part into which the fuel discharge side of the fuel pump is inserted with force.

3. The fuel feed apparatus according to claim 1, wherein the hooking projection part and the hooking projection receiving part are circularly arranged on the discharge side of the fuel pump at a plurality of locations.

4. A fuel feed apparatus arranged in a fuel tank to feed fuel in the fuel tank to outside of the tank comprising:

a mounting member attached to the fuel tank;

a fuel pump which is electrically-driven to discharge suction fuel; and a fuel filter including a filter element to remove debris contained in the discharged fuel by the fuel pump and a filter case accommodating the filter element and connected with the mounting member, wherein the filter case has a press-insertion part which is ringed and supporting the fuel pump, into which a fuel discharge side of the fuel pump is inserted with force, a fuel suction side of the fuel pump is in free condition.

5. The fuel feed apparatus according to claim 4, further comprising:

a pressure regulator for controlling pressure of the fuel flowing out of the fuel filter; and a sub-tank arranged in the fuel tank and accommodating the fuel filter and the fuel pump, wherein a fuel inlet port of the pressure regulator is directly coupled with the filter case, and a fuel outlet port of the pressure regulator is directly coupled with the sub-tank.

6. The fuel feed apparatus according to claim 4, further comprising:

a sub-tank arranged in the fuel tank, and accommodating the fuel filter and the fuel pump;

a pressure regulator arranged in the sub-tank for controlling pressure of the fuel flowing out of the fuel filter; and a jet pump sucking fuel in the fuel tank, and feeding the fuel in the sub-tank by utilizing negative pressure generated by jetting surplus fuel discharged from the pressure regulator, wherein the fuel inlet port of the jet pump introducing the surplus fuel discharged from the pressure regulator is formed in the sub-tank.

7. The fuel feed apparatus according to claim 6, wherein a fuel outlet port of the pressure regulator is directly coupled with the fuel inlet port of the jet pump.

* * * * *